(12) United States Patent
Henrichsen et al.

(10) Patent No.: US 11,964,348 B2
(45) Date of Patent: Apr. 23, 2024

(54) MOLD ADAPTED FOR PRODUCING AT LEAST A PART OF A WIND TURBINE BLADE

(71) Applicant: Siemens Gamesa Renewable Energy, Brande (DK)

(72) Inventors: Soeren Randrup Daugaard Henrichsen, Vodskov (DK); Mogens Nielsen, Aalborg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 17/340,472

(22) Filed: Jun. 7, 2021

(65) Prior Publication Data
US 2021/0387295 A1 Dec. 16, 2021

(30) Foreign Application Priority Data
Jun. 12, 2020 (EP) .................................. 20179652

(51) Int. Cl.
*B23P 15/04* (2006.01)
*B29C 33/30* (2006.01)
*F03D 80/00* (2016.01)

(52) U.S. Cl.
CPC ............ *B23P 15/04* (2013.01); *B29C 33/306* (2013.01); *B29C 33/307* (2013.01); *F03D 80/00* (2016.05); *F05D 2230/20* (2013.01)

(58) Field of Classification Search
CPC ........... B29L 2031/085; B29L 2031/08; B29D 99/0028; B29C 33/301; B29C 33/306; B29C 33/307; B29C 33/308; B29C 33/0088; B23P 15/04; B23P 14/04; Y02P 70/50; Y02E 10/72; F05D 2230/20; F03D 1/0675; F03D 80/00
See application file for complete search history.

(56) References Cited

U.S. PATENT DOCUMENTS

| | | | |
|---|---|---|---|
| 2004/0005373 A1* | 1/2004 | Morandi | B27D 1/083 425/371 |
| 2012/0061024 A1 | 3/2012 | Starke | |
| 2012/0124833 A1 | 5/2012 | Arendt et al. | |

(Continued)

FOREIGN PATENT DOCUMENTS

| | | |
|---|---|---|
| CN | 203651002 U | 6/2014 |
| CN | 104080597 A | 10/2014 |

(Continued)

OTHER PUBLICATIONS

European Search Report and Written Opinion of the European Searching Authority dated Nov. 19, 2020 for Application No. 20179652.1.

*Primary Examiner* — Emmanuel S Luk
*Assistant Examiner* — Victoria Bartlett
(74) *Attorney, Agent, or Firm* — Schmeiser, Olsen & Watts, LLP (57) ABSTRACT

Provided is a mold adapted for producing a wind turbine blade, including a first carrier and a shell for accommodating blade building elements to be embedded in a resin matrix for building a blade body part, which shell is placed on the first carrier, and a second carrier changeable in its length and elongating the first carrier adapted to accommodate a prefabricated blade tip to be connected to the blade body part when the blade body part is built.

10 Claims, 4 Drawing Sheets

(56) References Cited

U.S. PATENT DOCUMENTS

| | | | |
|---|---|---|---|
| 2015/0010406 A1 | 1/2015 | Torgard | |
| 2015/0056081 A1 | 2/2015 | De Waal Malefijt | |
| 2017/0320276 A1* | 11/2017 | Pedersen | B29C 70/026 |
| 2019/0299343 A1 | 10/2019 | Schuring | |
| 2019/0299393 A1 | 10/2019 | Üyünük et al. | |
| 2020/0398459 A1* | 12/2020 | Lehmann | F03D 1/0675 |
| 2021/0060878 A1* | 3/2021 | Lehmann Madsen | B29D 99/0028 |
| 2021/0231097 A1* | 7/2021 | De L.M. Arias | F03D 1/0675 |
| 2022/0364542 A1 | 11/2022 | Hayden | |

FOREIGN PATENT DOCUMENTS

| | | |
|---|---|---|
| CN | 204081527 U | 1/2015 |
| CN | 110177933 A | 8/2019 |
| CN | 209683756 U | 11/2019 |
| CN | 114651124 A | 6/2022 |
| WO | WO 2012093136 A2 | 7/2012 |
| WO | 2019234050 A1 | 12/2019 |
| WO | WO 2020078519 A1 | 4/2020 |

* cited by examiner

MOLD ADAPTED FOR PRODUCING AT LEAST A PART OF A WIND TURBINE BLADE

CROSS-REFERENCE TO RELATED APPLICATIONS

This application claims priority to European Application No. 20179652.1, having a filing date of Jun. 12, 2020, the entire contents of which are hereby incorporated by reference.

FIELD OF TECHNOLOGY

The following refers to a mold adapted for producing at least a part of a wind turbine blade.

BACKGROUND

Wind turbines are commonly known. They comprise a tower and a nacelle arranged on top of the tower. The nacelle comprises a hub, to which several, usually three rotor blades are attached. They interact with blowing wind making the hub rotate. The hub is coupled to an electric generator for producing electric power as commonly known.

A wind turbine respectively a rotor blade is a hollow construction with an elongated blade body having a root section usually of cylindrical shape, by which it is attached to the hub. The root section is followed by the long blade body which changes its shape significantly from the root to the tip, as it merges from the cylindrical cross-section at the root section to an airfoil cross-section, which then runs to the tip.

Such a blade is built of several blade building elements comprising among others fibre webs, wooden or polymer core elements or a web with spar caps etc., which building elements are embedded in a resin matrix. Usually, two different ways of manufacturing a turbine blade are known. In a first alternative, the blade comprises two shells, i.e., an upper and a lower shell, which are separately manufactured in respective molds and which are attached to each other for finally building the blade. In a second alternative, for which the inventive mold is designed, the blade is manufactured in a one-shot procedure. In this procedure, all building elements for producing the whole blade, like the already mentioned fibre webs, the core elements, the webs and spar caps etc., are placed in a respective shell which is part of the mold, with mandrels being inserted in this construction for filling the inner space of this construction to avoid resin entering and filling the hollow inner of the blade. When all elements are arranged, the construction is infused with resin, so that all elements are embedded in the resin matrix in a single shot.

For producing such a wind turbine blade, no matter if it is produced with separate upper and lower shells etc., or in a one-shot procedure, the blade design especially in view of the length of the blade is usually specified at an early stage of the development of the turbine on a non-major design applying certain design uncertainty factors. Based on this early frozen design, the geometry of the mold is determined, which mold is then manufactured defining the final blade geometry. Such a mold is in view of the length of the blade a very complex and especially long construction, which needs to be designed to carry the relatively high load of the finally produced blade or blade part. The mold design is adapted to the blade design. However, during the long-lasting development, the blade design may be adapted and mature both with regard to its design and maybe the specific loads. It may therefore be possible that the blade design changes especially regarding the blade length. This however entails problems with the previously determined mold concept, as the mold is already produced. The mold then needs to be cut and new mold pieces need to be built and inserted to provide a mold with the updated geometry. For this reason, the length of a blade is usually not changed.

SUMMARY

An aspect relates to an improved mold for producing a wind turbine blade.

For solving the problem, the embodiments propose a mold adapted for producing a wind turbine blade, comprising a first carrier means or carrier and shell means or shell for accommodating blade building elements to be embedded in a resin matrix for building a blade body part, which shell means or shell is placed on the first carrier means or carrier, and a second carrier means or carrier changeable in its length and elongating the first carrier means or carrier adapted to accommodate a pre-fabricated blade tip to be connected to the blade body part when the blade body part is built.

The embodiments of the invention propose a mold comprising a modular carrier means or carrier. The carrier means or carrier comprises a first carrier means or carrier, and a second carrier means or carrier. On the first carrier means or carrier, a shell means or shell comprising one or more shell elements is arranged. In this shell means or shell, the necessary blade building elements like fibre webs, core elements, webs with spar caps etc. are arranged, which are necessary for building a blade body part starting with the root section and ending in a section, which is followed by the tip section. This means, that this blade body part is built using the mold in a one-shot procedure by infiltrating the resin for embedding all blade building elements in a resin matrix. So, the blade body part is built on the shell means or shell resting on the first carrier means or carrier, as the blade body part is only a part of the whole blade, although it is the main part. Nevertheless, it does not have a tip section, which is not produced in this one-shot process. The blade tip is produced separately, it is pre-fabricated and is attached to the blade building element construction erected in the shell means or shell before the resin is infused in order to firmly connect the blade tip to the blade body part by a mechanical connection and the resin infusion. In order to allow for the attachment of the pre-fabricated tip to the blade building element construction, the inventive mold comprises a second carrier means or carrier, which is attached to the first carrier means or carrier and which elongates the first carrier means or carrier. The second carrier means or carrier is adapted to accommodate the pre-fabricated blade tip.

As mentioned above, it may happen, that during the long-lasting development a longer blade is appreciated. The inventive mold is adapted to allow for changes in the blade design respectively the blade length, as it is possible to simply change the setup of the mold respectively the length of the mold. According to the embodiments of the invention, the second carrier means or carrier is changeable in its length, allowing for modification of the overall length of the carrier means or carrier and for adaption of the length of the carrier means or carrier to the final determined blade length. As the blade tip is pre-fabricated, it is possible to simply change the length of the whole blade by adapting the length of the blade tip attached to the blade building element construction and by adapting the length of the second carrier means or carrier for precisely supporting the pre-fabricated blade tip.

So, the inventive mold allows for changing the overall mold length in a simple way by adapting the length of the second carrier means or carrier according to the length of the pre-fabricated blade tip. The use of a pre-fabricated blade tip further allows for simply changing the blade length, as it is much easier to only produce a specific blade tip and to maintain the setup of the blade body part built in a one-shot procedure using the inventive mold.

As the second carrier means or carrier needs to carry the pre-fabricated blade tip having a specific air foil cross-section, the second carrier means or carrier is provided with specific support elements for accommodating the blade tip. The support elements have a saddle-like form, which is adapted to the airfoil form of the blade tip, so that the blade tip is arranged in a kind of form-fit manner on the saddle-like support elements, several of which are arranged at the second carrier means or carrier.

As the blade tip is a pre-fabricated item, which is connected to the non-infused blade building element construction built on the shell means or shell, it is necessary to exactly adjust the position of the blade tip to the position of the blade element construction, so that the mechanical connection can be realised. In order to arrange the tip in an excellent position, the embodiments of the invention proposes to connect each support element to a lifting means or lifter for changing the position of the support element. The lifting means or lifter allows for adjusting the height respectively the vertical position of each support element, so that the height respectively vertical position of the blade tip can be very precisely adjusted. This is necessary, as due to a changing length of the blade tip also the overall form respectively cross-section of the blade tip varies from tip type to tip type, so that an adjustment on the carrier means or carrier side via the support elements is necessary.

Each lifting means or lifter comprises at least one telescope cylinder, a hydraulic or pneumatic cylinder, which can be very precisely controlled and adjusted by respective control means or controller.

In a further embodiment, each support element is connected with both ends to a separate cylinder, with each cylinder being separately controllable. This allows, in addition to the height adjustment also for an adjustment regarding the tilt of the support element, which can be slightly tilted around the longitudinal axis of the second carrier means or carrier. It is possible to raise or lower one support element side, while the other remains unchanged, and vice versa, while certainly also both element ends may be lifted or lowered. Any kind of adjustment is possible, as the cylinders are separately controllable.

As mentioned, the embodiments of the invention propose a second carrier means or carrier which is changeable in its length. For realizing this central inventive idea several alternatives are feasible. According to a first alternative, the inventive mold comprises several second carrier means or carrier having different lengths, each of which is attachable to the first carrier means or carrier. In this embodiment, the mold respectively the carrier means or carrier is modular and comprises, besides the first carrier means or carrier, at least two, or more second carrier means or carrier. The carrier means or carrier have different lengths and comprise different numbers of support elements. The distance between two support elements at each different second carrier means or carrier should be the same, so that each pre-fabricated tip is supported in a comparable way on the respective varying second carrier means or carrier.

As mentioned, each second carrier means or carrier is connected to the first carrier means or carrier. To allow for a standardised way of connection, each second carrier means or carrier comprises a standardised connection interface for connecting it to a connection interface of the first carrier means or carrier. All pre-fabricated second carrier means or carrier have the same standardised connection interface, which corresponds to the adapted connection interface at the first connection means. So, the way of connecting each second carrier means or carrier to the first carrier means or carrier is the same, no matter which second carrier means or carrier is attached.

The connection realized by the respective connection interfaces may be a flange connection. Here, both the first carrier means or carrier and each second carrier means or carrier comprises one or several flanges building the respective connection interface, which flanges abut each other, when the second carrier means or carrier is in position. The flanges are fixed by bolt connections, with bolts extending through respective bores in the flanges and respective nuts are screwed on the bolts to tightly fix the connection.

In an alternative, each connection realized by the respective connection interfaces may be a plug-in connection. Here, the connection is realized by snap-on or latching connection elements provided at the first and second carrier means or carrier. The connection interfaces are for example realized by respective tube-like elements, with for example the tube-like element of the second carrier means or carrier being inserted in the tube-like element of the first connection means and being fixed by interacting snap-on or latching connection elements.

In a second alternative of the overall setup of the second carrier means or carrier the second carrier means or carrier may comprise several carrier elements alignable and connectable in a row, wherein the number of carrier elements aligned and connected is variable for varying the length of the second carrier means or carrier. Also here, the mold respectively the carrier means or carrier is modular, while also the second carrier means or carrier itself is a modular means comprising a number of separate carrier elements. The separate carrier elements are aligned in a row and are connected for building the second carrier means or carrier. Depending on the number of aligned and connected carrier elements the total length of the second carrier means or carrier can be adjusted. So, for elongating a second carrier means or carrier it is only necessary to attach one, two or more additional carrier elements to the already aligned and connected carrier elements, or to remove one or more aligned and connected carrier elements, when the second carrier means or carrier is shortened.

In an embodiment, each carrier element comprises at least one saddle-like support element. The design of this modular second carrier means or carrier is such that each additional carrier element provides a carrying function, as it comprises at least one saddle-like support element. So, with each additional carrier element another support level is provided.

As also in this embodiment separate items, i.e., the carrier elements are removable connected to each other, it is also here advantageous that each carrier element comprises a standardised connection interface for connecting it to an adjacent carrier element or to a connection interface of the first carrier means or carrier. Again, standardised connection interfaces are provided, so that it is easily possible to connect the respective carrier elements in the same way.

The connections realised by the respective connection interfaces are either flange connections or plug-in connections. For realizing the flange connections, each carrier element comprises respective flanges with bores, so that the abutting flanges of two adjacent connection elements can be fixed by a bolt connection comprising a bolt and a nut. In case a plug-in connection is realised, the carrier elements comprise respective engaging elements like tube-like elements, which are fixed by snap-on or latching connection elements.

According to a third alternative regarding the setup of the second carrier means or carrier the second carrier means or carrier is a telescopic means or is telescopticwhich can be changed in its length by telescopically elongating and shortening it. Here, the second carrier means or carrier is not a modular means but comprises a certain number of carrier elements, which are telescopically interlinked. It is possible to change the length of the second carrier means or carrier from a retracted short position, in which all carrier elements are as close as possible to each other, to an extended long position, where all carrier elements are distanced from each other as much as possible. This embodiment allows for a very simple adjustment of the length, as the second carrier means or carrier is permanently attached to the first carrier means or carrier and the adjustment is simply realised by automatically telescoping the second carrier means or carrier. No mechanical connections need to be fixed or loosened.

The carrier means or carrier comprises several carrier elements telescopically linked in a row and movable with at least one actuator means or actuator. This actuator means or actuator allows for an automatic telescopic movement of the respective carrier elements and therefore for an automatic adjustment of the length of the second carrier means or carrier.

In an embodiment, the carrier elements are arranged such that the carrier elements are moved one after the other when the carrier means or carrier is extended from a retracted to an extended position and vice versa. So, when the second carrier means or carrier is for example in the shortest position and the actuator is controlled to extend it, the first carrier means or carrier is moved until it is in a maximum distance relative to the second carrier element, which is then also moved until it is in a maximum distance to the third carrier means or carrier, which is then moved etc. When the second carrier means or carrier is shortened, the movement is the opposite way, for example starting again with the first carrier means or carrier which is moved towards the second carrier means or carrier etc. In an alternative it is possible to have a synchronised movement of all carrier elements. Here the distance between two adjacent carrier elements changes synchronised and is the same between all pairs of carrier elements at any time.

The actuator means or actuator is a cylinder, which may for example be a hydraulic or pneumatic cylinder. By using such a cylinder, the length adjustment is very precisely controllable by a respective control means or controller.

Finally, also the first carrier means or carrier may comprise several first carrier means or carrier arranged and connected in a row. According to this embodiment, also the first carrier means or carrier is modular, which allows, when the mold is built, for an easy setup of the first carrier means or carrier.

BRIEF DESCRIPTION

Some of the embodiments will be described in detail, with references to the following Figures, wherein like designations denote like members, wherein.

DETAILED DESCRIPTION

Figure 1:
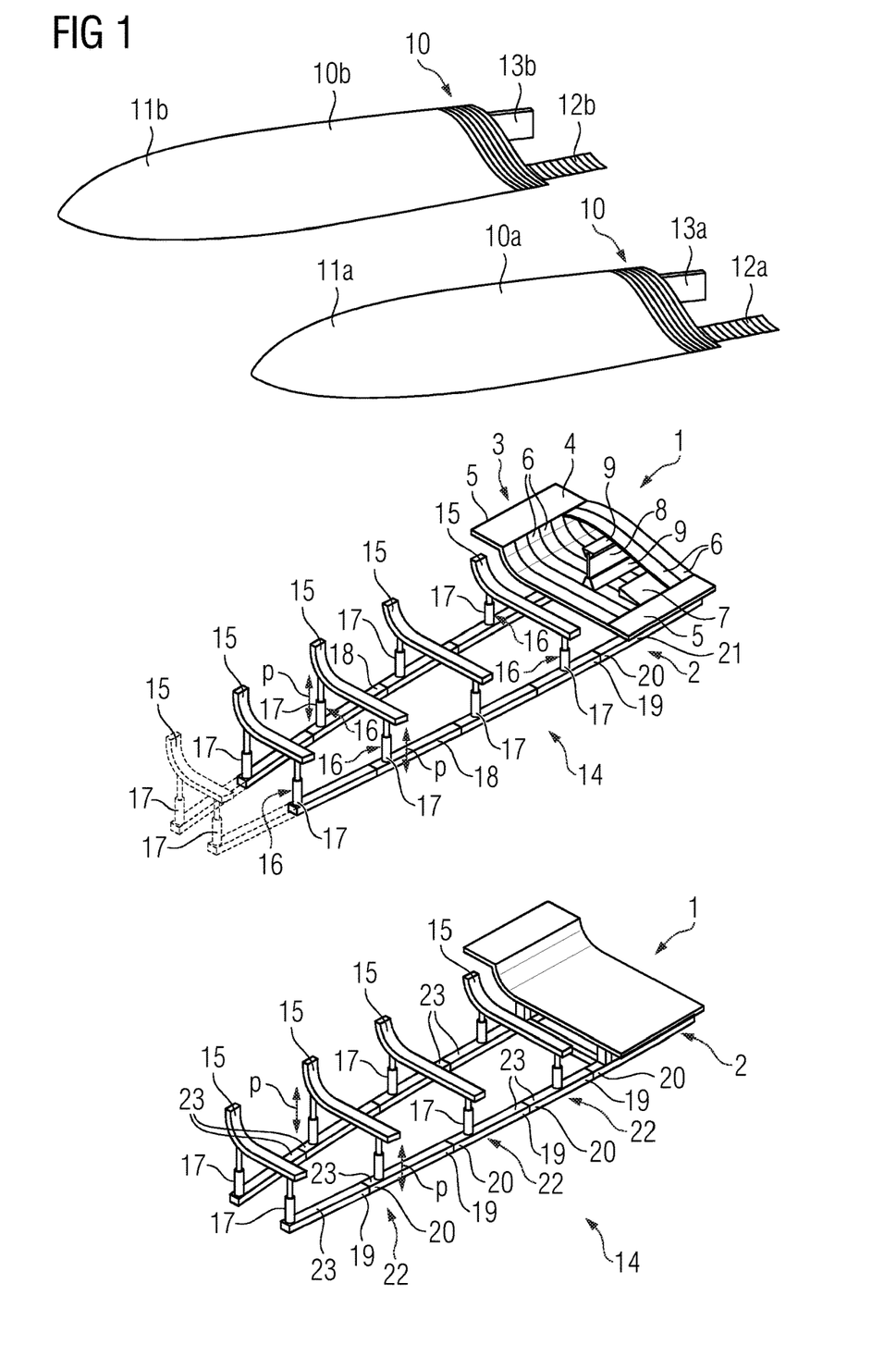
FIG. 1 depicts a principle illustration of an inventive mold.

FIG. 1 shows an inventive mold 1, adapted for producing a wind turbine blade in a one-shot infusion process. The mold 1 comprises a first carrier means or carrier 2 adapted to carry a shell means or shell 3 comprising one or more separate shell elements 4. The shell means or shell 3 respectively the shell elements 4 comprise respective side flanges 5, with which they are supported on the first carrier means or carrier 2. In this shell means or shell 3 the necessary blade building elements for building a blade body part by finally infusing and embedding the blade building elements in a resin matrix, as commonly known, are arranged. These blade building elements for example comprise fibre webs 6, for example glass fibre webs, which are arranged on the shell means or shell and extend over the upper side of the blade building element construction. It further comprises several core elements 7, for example made of polymer, polymer foam or wood, and at least one web 8 with respective spar caps 9, which items are covered by the fibre webs 6 as commonly known. This blade building element construction is finally embedded in the resin matrix, which is applied during a vacuum infusion.

The first carrier means or carrier 2 and the shell means or shell 3 are used for building only a blade body part, which extends from the root (not shown) over a remarkable length of the finally built blade to a position, where a pre-fabricated blade tip 10 is attached to the blade building element construction, as shown in principle in FIG. 1. The tip is pre-fabricated and may have a varying length, as shown by the two different tips 10a, 10b in FIG. 1. While the tip 10a is shorter, finally leading to a shorter blade, when it is completed, the tip 10b is longer, leading to a longer final blade. Each tip 10, 10a, 10b is also built from respective blade building elements like fibre mats, core elements, webs and spar caps etc., which are finally infused in a resin matrix, so that the pre-fabricated tip 10, 10a, 10b solely needs to be connected to the blade body part, which is built on the shell means or shell 3. The pre-fabricated tip 10, 10a, 10b is positioned and attached to the non-infused blade element construction, as in principle shown in FIG. 1. When it is in position, the infusion is performed, so that a tight mechanical connection of the tip 10, 10a, 10b to the finally built respectively infused blade body part is realised. For the mechanical connection the tip 10, 10a, 10b, for example comprises respective core elements 12a, or connection elements 13a, respectively 12b and 13b, with which they engage in the blade body element construction on the shell means or shell 3 for infusing them also in the respective resin matrix.

For positioning the respective tip 10, 10a, 10b relative to the blade building element construction on the shell means or shell 3, the mold 2 comprises a second carrier means or carrier 14, which is changeable in its length. It comprises several support elements 15, which have a saddle-like shape corresponding to the cross-section respectively the outer form of the respective tip 10, 10a, 10b for accommodating it in a kind of form-fit support. This assures, that the respective pre-fabricated tip 10, 10a, 10b cannot move to the side, but can only be moved in a longitudinal direction for bringing it in an aligned axial position relative to the blade body element construction.

Each support 15 is arranged with both ends at a respective lifting means or lifter 16 in form of respective cylinders, for example hydraulic or pneumatic cylinder 17, so that each support 15 can be adjusted in its height respectively vertical position. Each cylinder 17 is separately controllable by a respective control means or controller, with only one control means or controller controlling all cylinders 17. This allows for an exact height adjustment of the respective supports and therefore of the pre-fabricated tip 10, 10a, 10b, while also a certain tilt adjustment is possible, as each cylinder 17 can be separately controlled.

This support and cylinder construction is arranged on respective frame elements 18, which frame elements 18, as a part of the second carrier means or carrier 14, comprise respective connection interfaces 19 connecting the second carrier means or carrier 14 to respective connection interfaces 20 arranged at respective frame elements 21 of the first carrier means or carrier 2.

This allows for removing the second carrier means or carrier and changing it to another second carrier means or carrier 14, which, when the length of the blade is changed, allows for carrying and adjusting a tip which is shorter or longer than the originally designed tip.

FIG. 1 shows the overall possibility to change the length of the second carrier means or carrier 14 by the extension shown with the dashed lines. While the second carrier means or carrier 14 shown with the continuous line is adapted to carry the tip 10a, the extended second carrier means or carrier 14 also comprising the support 15 and the cylinder 17 shown with the dashed line is adapted to carry the longer tip 10b, so that also this longer tip is safely carried and can be adjusted over its whole length.

It is obvious that the possibility of changing the length of the second carrier means or carrier 14 allows for adjusting the overall length of the mold 1 in view of any design changes regarding the blade length. It is only necessary to change the length of the second carrier means or carrier 2, but not of the whole mold setup by cutting the pre-fabricated mold etc., as it is necessary in the conventional art.

Figure 2:
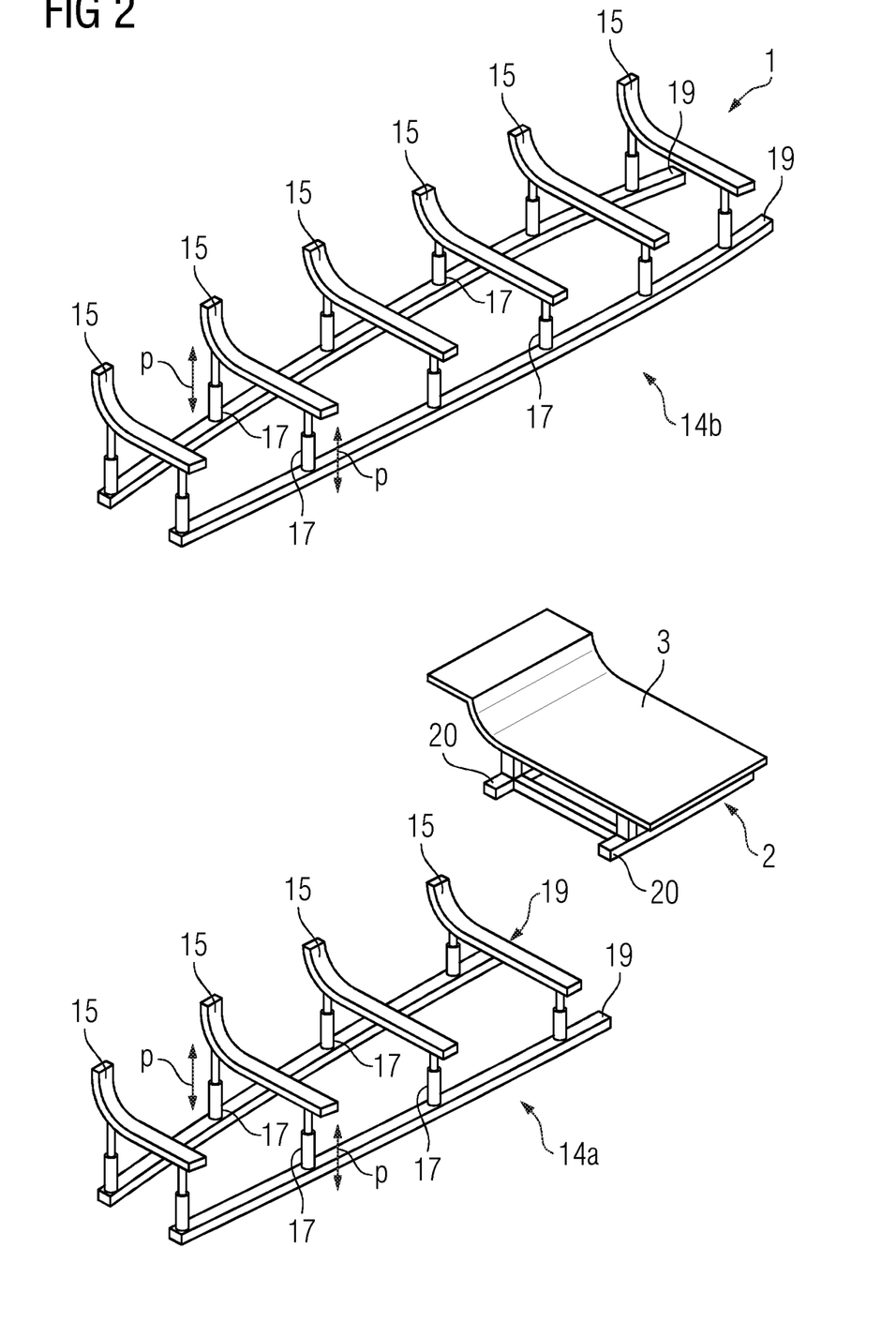
FIG. 2 depicts a first embodiment of an inventive mold comprising several second carrier means or carrier having different lengths.

There are several inventive concepts for realizing the length changing possibility. A first embodiment is shown in FIG. 2. FIG. 2 shows a principal illustration of the inventive mold 1, with the first carrier means or carrier 2 and the shell means or shell 3 arranged on it. It also shows two different second carrier means or carrier 14a and 14b, which obviously have different lengths. While the second carrier means or carrier 14a comprises four saddle-shaped supports 15, attached to respective height adjusting cylinders 17 as shown by the arrows P, the longer second carrier means or carrier 14b comprises six saddle-like support elements 15 each being connected to two respective height adjustment cylinders.

For connecting both second carrier means or carrier 14a, 14b to the first carrier means or carrier 2 the second carrier means or carrier 14a, 14b comprise standardised connection interfaces 19, which are adapted to standardised connection interfaces 20 at the first connection means 2, so that the way of connecting any of the second connection means 14a, 14b to the first connection means 2 is the same. The connection interfaces 19, 20 may for example provide a flange connection or a plug-in connection or the like.

While FIG. 2 shows only two exchangeable second carrier means or carrier 14a, 14b, it is obvious, that also more exchangeable second carrier means or carrier may be provided, being even longer or shorter or having a length in between.

Figure 3:
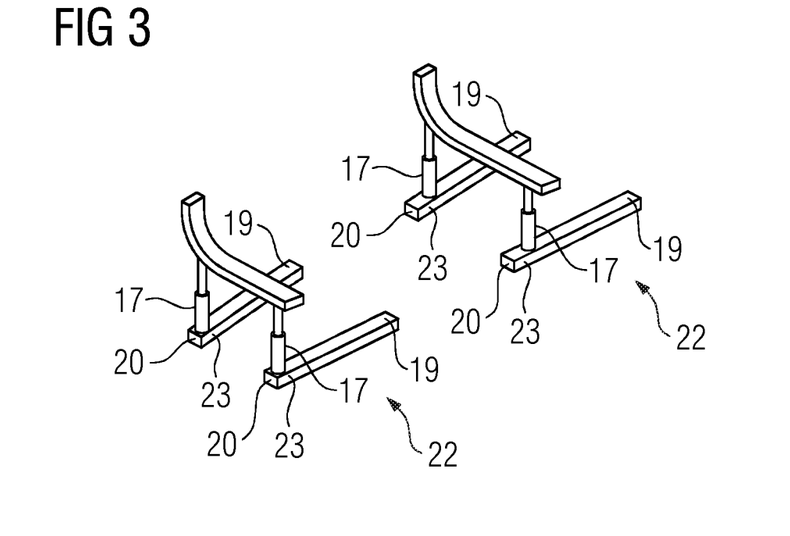
FIG. 3 depicts a second embodiment of an inventive mold having a modular second carrier means or carrier comprising several separate carrier elements.

FIG. 3 shows a second embodiment of an inventive mold 1, again comprising a first carrier means or carrier 2 with the shell means or shell 3 arranged on it, and a second carrier means or carrier 14 attached to the first carrier means or carrier 2 again by respective standardised connection interfaces 19, 20.

In this embodiment, the second connection interface 14 is modular. It comprises a number of several separate carrier elements 22, each comprising two lower frame elements 23, to which respective cylinders 17 are attached. To the cylinders 17 again respective support elements 15 are attached, so that they are adjustable in height and tilt.

Each separate carrier element 22 comprises respective standardised connection interfaces 19 at the one end and 20 at the other end allowing for aligning and connecting an arbitrary number of carrier elements 22 in a row for building the second carrier means or carrier 14. It is obvious that by varying the number of aligned and connected carrier elements 22, the overall length of the second carrier means or carrier 14 can be adjusted to the need according to the final length of the pre-fabricated tip 10 which shall be carried.

In this embodiment, the two carrier elements 22, which are shown separate to the connected ones making the second carrier means or carrier 14, may for example be connected to the final end standing carrier element 22 or may be integrated in the row at a middle position or the like. Due to the standardised connection interfaces 19, 20, which again are for example flange connections or plug-in connections, it is easily possible to connect two adjacent carrier elements 22, but also to loosen two connected carrier elements 22 either for shortening the second carrier element 14, or for integrating a carrier element 22 somewhere in the row.

Figure 4:
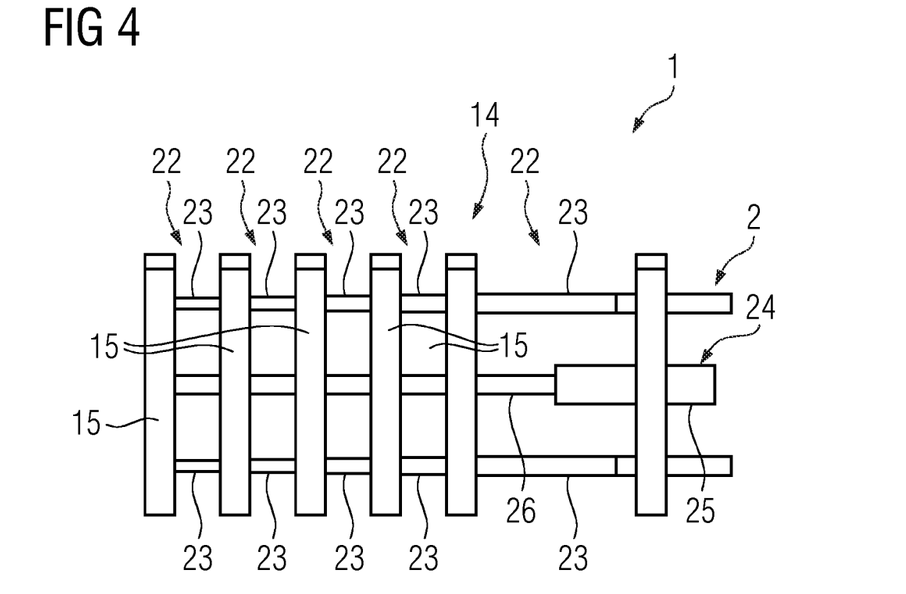
FIG. 4 depicts a third embodiment of an inventive mold comprising a second carrier means or carrier being telescopically changeable.
Figure 5:
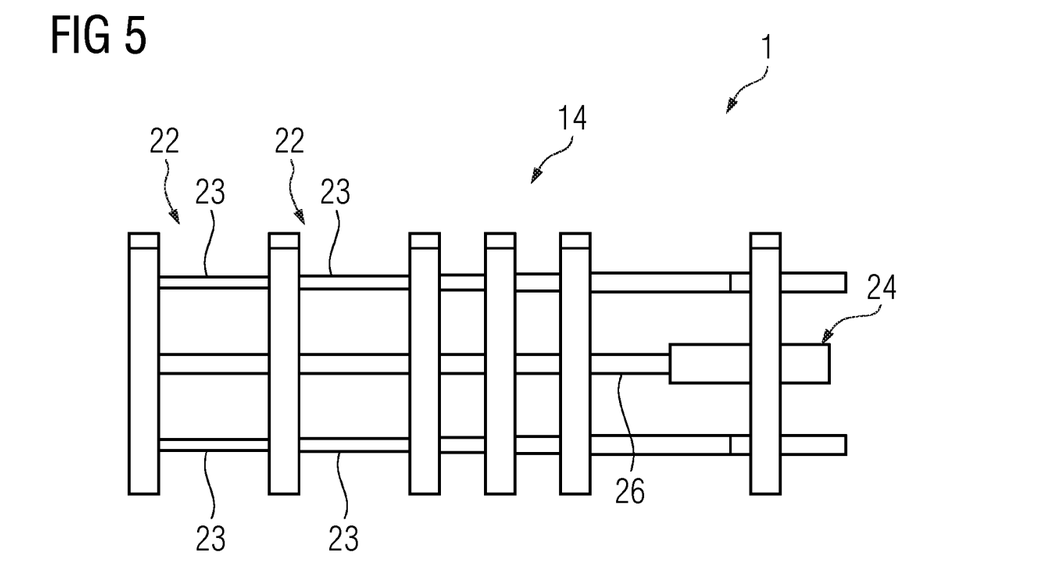
FIG. 5 depicts a third embodiment of an inventive mold comprising a second carrier means or carrier being telescopically changeable.
Figure 6:
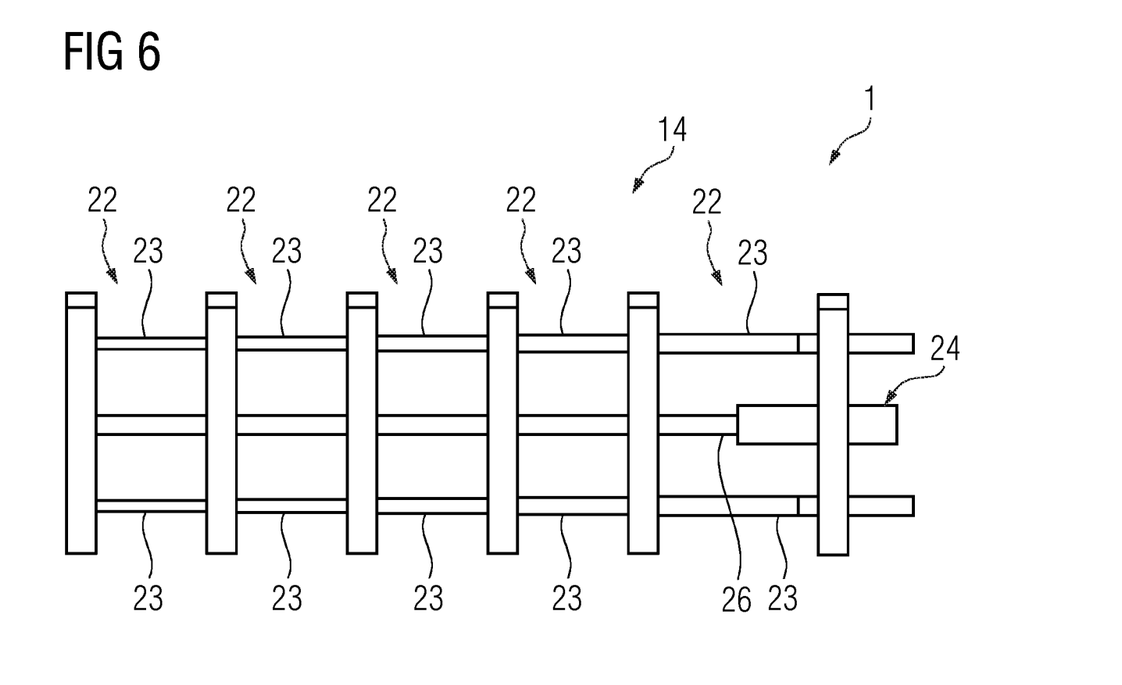
FIG. 6 depicts a third embodiment of an inventive mold comprising a second carrier means or carrier being telescopically changeable.

Finally, the FIGS. 4-6 show a third embodiment of an inventive mold 1. The mold again comprises a first carrier means or carrier 2, which is again only shown in part and which carries a shell means or shell 3, which is not shown. The mold 1 further comprises a second carrier means or carrier 14, which length can be changed by telescopically extending and shortening it. The second carrier means or carrier 14 comprises in this example five carrier elements 22. Each carrier element 22 comprises a saddle-like support 15, respective cylinders 17, which are not shown, and respective frame elements 23, by which they are telescopically connected. Each frame element 23 is for example a pipe-like element, so that one frame element 23 engages into an adjacent frame element 23, so that they can telescopically be moved relative to one another.

Also shown is an actuator 24 here in form of a hydraulic or pneumatic cylinder 25, having a movable rod 26 connected to the end-standing (left) carrier element 22.

FIG. 4 shows the telescopic second carrier means or carrier 14 in the retracted, short position, all carrier elements 22 are moved as close to one another as possible.

FIG. 5 shows the second carrier means or carrier 14 in a partially extended form. The actuator 24 has pushed the first and second carrier element 22 (seen from the left side) away from the other carrier elements 22, so that the second carrier means or carrier 14 is extended. When the rod 6 is pushed to the left side, at first the first carrier element 22 is moved until it reaches a maximum distance relative to the adjacent second carrier element 22, which is, when the rod 26 is further moved, automatically moved together with the first carrier element 22. All carrier elements 22 are for example coupled by respective driving pins, so that in a certain relative position towards each other they are automatically moved together.

When the rod 26 is further extended from the position shown in FIG. 5, also the other following carrier elements 22 are telescopically extended, until they reach the final extension length, as for example shown in FIG. 6.

For shortening the second carrier means or carrier 14, the actuator 24 pulls the rod 26, so that again the first left carrier element 22 is moved towards the adjacent second carrier element 22, until it abuts it and takes it with it, so that finally all carrier elements 22 can again be moved back to the small, retracted position.

This embodiment allows for a length adjustment without any mechanical action to be taken, as the length can automatically be adjusted by controlling the actuator 24.

Besides this telescopic linkage of the carrier elements 22, where they are moved one after the other, it is possible to connect them in a way that they are all moved synchronously and are all synchronously spaced from each other, so that they are all equally distanced no matter how long or short the second carrier means or carrier 14 is. This means that the distance changes during movement, but between all pairs of carrier elements 22 in the same way.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A mold adapted for producing a wind turbine blade, comprising: a first carrier and a shell for accommodating blade building elements to be embedded in a resin matrix for building a blade body part, which shell is placed on the first carrier, and a second carrier changeable in its length and elongating the first carrier adapted to accommodate a prefabricated blade tip to be connected to the blade body part when the blade body part is built, herein the second carrier comprises a plurality of carrier elements telescopically linked in a row and movable with at least one actuator, wherein each carrier element of the plurality of carrier elements comprises at least one frame element, wherein the at least one frame element of a respective carrier element engages with the at least one frame element of an adjacent carrier element such that the plurality of carrier elements are telescopically linked, wherein ach carrier element of the plurality of carrier elements comprises at least one saddle-like support element or carrying the prefabricated blade tip, and wherein the at least one saddle-like support element is connected to a lifter for changing a position of the at least one saddle-like support element.

2. The mold according to claim 1, wherein the lifter comprises at least one telescope cylinder.

3. The mold according to claim 2, wherein each support element is connected with both ends to a separate cylinder, with each cylinder being separately controllable.

4. The mold according to claim 1, wherein at least one carrier element comprises a standardised connection interface for connecting it to a connection interface of the first carrier.

5. The mold according to claim 4, wherein connections realised by the respective connection interfaces are flange connections or are plug-in connections using snap-on, latching, or tube-like connection elements.

6. The mold according to claim 1, wherein each carrier element comprises a standardised connection interface for connecting it to an adjacent carrier element or to a connection interface of the first carrier.

7. The mold according to claim 6, wherein connections realised by the respective connection interfaces are flange connections or are plug-in connections using snap-on, latching, or tube-like connection elements.

8. The mold according to claim 1, wherein the carrier elements are arranged such that the carrier elements are moved sequentially when the second carrier is extended from a retracted to an extended position and vice versa, or that the carrier elements are all synchronously moved.

9. The mold according to claim 1, wherein the actuator is a cylinder.

10. The mold according to claim 1, wherein the first carrier comprises several first carrier elements arranged and connected in a row.

\* \* \* \* \*